(12) United States Patent
Loy

(10) Patent No.: US 6,363,524 B1
(45) Date of Patent: Mar. 26, 2002

(54) SYSTEM AND METHOD FOR ASSESSING THE NEED FOR INSTALLING SOFTWARE PATCHES IN A COMPUTER SYSTEM

(75) Inventor: Eric W Loy, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/393,904

(22) Filed: Sep. 10, 1999

(51) Int. Cl.7 .................................................. G06F 9/445
(52) U.S. Cl. ............................................. 717/11; 717/4
(58) Field of Search ..................... 717/3, 4, 11; 707/200, 707/201, 203, 204, 205; 709/217, 218, 219, 220, 221, 222, 223; 714/2, 15; 713/100

(56) References Cited

U.S. PATENT DOCUMENTS

| 5,805,891 | A | * | 9/1998 | Bizuneh et al. | ............. | 395/704 |
| 5,974,470 | A | * | 10/1999 | Hammond | .................. | 709/305 |
| 6,117,187 | A | * | 9/2000 | Staelin | ......................... | 717/11 |
| 6,161,218 | A | * | 12/2000 | Taylor | .......................... | 717/11 |
| 6,189,139 | B1 | * | 2/2001 | Ladd | .............................. | 717/4 |
| 6,202,207 | B1 | * | 3/2001 | Donohue | ..................... | 717/11 |
| 6,202,208 | B1 | * | 3/2001 | Holiday, Jr. | .................. | 717/11 |
| 6,317,880 | B1 | * | 11/2001 | Chamberlain et al. | ........ | 717/11 |

OTHER PUBLICATIONS

Ernst, "Patches and updates made easy", Windows MAgazine, 1998, p. 86.*
Gaffney, "Patching Solaris", System Adminitration, Apr. 1999, pp. 24–35.*
Angelopoulos, "Updates, upgrades and patches", Popular Electronics, Aug. 1999, pp. 13–16.*

* cited by examiner

Primary Examiner—Kakali Chaki

(57) ABSTRACT

The present invention is generally directed to a system and method for critical patches for installation on a given computer system. In accordance with one aspect of the invention, the method includes the steps of obtaining an identification of installed components on the computer system, and obtaining a list of all relevant patches for the installed components. The method further generates a Boolean logic expression for each relevant patch, and evaluates each Boolean logic expression to determine a minimal set of patches to be installed, which minimal set of patches include all patches for all critical errors. In essence, a database containing all patch information for a given family, or all families, of software components of a computer system may be accessed, and a Boolean logic expression may be constructed for a given family of patches. Specifically, the Boolean logic expression may express which patches (or alternative patch configurations) should be installed in order to have all critical defects effectively patched. In one embodiment, the system may evaluate the current configuration of a given computer system to determine what patches are presently installed, and determine the fewest additional patches that need to be installed to correct or repair all critical defects in the family, or families, of software.

18 Claims, 5 Drawing Sheets

SYSTEM AND METHOD FOR ASSESSING THE NEED FOR INSTALLING SOFTWARE PATCHES IN A COMPUTER SYSTEM

BACKGROUND OF THE INVENTION

1. Field of the Invention

The present invention generally relates to computer systems, and more particularly to a system and method for assessing the need for installing software patches in a computer system.

2. Discussion of the Related Art

In recent years, the field of computer systems and computer programming has grown exponentially. With computing speeds and technology ever-increasing, the complexity and sophistication of computer programs is increasing commensurately. Due to a number of factors, including increased product sophistication, hurried deadlines to market, inadequate testing, etc., many computer programs are released with various defects, which are later discovered. A defect is generally termed as either a "critical" or "non-critical" defect, depending upon the ramifications of the defect. Defects that may corrupt system resources, or even crash a system altogether, are termed "critical," while other more benign defects are termed "non-critical."

As is known, defects are normally corrected through software "patches," which are programs that install over a program containing a defect. Specifically, patches are designed to integrate into a program and replace known, existing defects. For a given software program, particularly after the program has been available for a long time, there are often a number of identified defects, and correspondingly a number of patches. Indeed, frequently patches are created to replace other patches, for a given program.

By way of nomenclature, a patch that corrects a critical defect is called a critical patch. A patch that replaces a critical patch, but adds nothing new to the correction of the critical error (instead only additionally correcting non-critical defects) is called a "supersedes critical" patch (or "supercedes" patch). Similarly, a patch that corrects only non-critical defects is called a "non-critical" patch.

Frequently, people desire only to install patches that are necessary to correct critical errors. Thus, in such situations, non-critical patches need not be installed. In fact, many supercedes patches need not be installed, if certain prior critical patches have already been installed. In systems having a number of patches, it is often a difficult or painstaking process to determine whether a given supercedes patch is necessary, or whether the critical defect corrected therein has already been corrected by a previously installed patch.

Accordingly, there is a desire to provide a system and method for accessing the need for installing software patches in a given computer system. In one scenario, there is a need for a system and method that can evaluate a system configuration and generate a list of software patches for critical patches that need to be installed on that evaluated system. In another scenario, there is a need for a system and method that can evaluate a system configuration and determine whether a specific software patch needs to be installed (i.e., whether the specific patch corrects a critical error that has not been corrected with a previous patch).

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for critical patches for installation on a given computer system. In accordance with one aspect of the invention, the method includes the steps of obtaining an identification of installed components on the computer system, and obtaining a list of all relevant patches for the installed components. The method further generates a Boolean logic expression for each relevant patch, and evaluates each Boolean logic expression to determine a minimal set of patches to be installed, which minimal set of patches include patches for all critical errors.

In essence, a database containing all patch information for a given family, or all families, of software components of a computer system may be accessed, and a Boolean logic expression may be constructed for a given family of patches. Specifically, the Boolean logic expression may express which patches (or alternative patch configurations) should be installed in order to have all critical defects effectively patched. In one embodiment, the system may evaluate the current configuration of a given computer system to determine what patches are presently installed, and determine the fewest additional patches that need to be installed to correct or repair all critical defects in the family, or families, of software.

In accordance with another aspect of the invention, a method is provided for determining whether a given software patch is a critical patch that is recommended for installation on a given computer system. In accordance with this inventive aspect, the method obtains patch information for a family of patches that are related to the given software patch, and obtains an identification of patches within the family of patches that are currently installed on the computer system. The method then identifies a predecessor list, wherein the predecessor list includes a sequence of patches in the family of patches that precede the given software patch, and constructs a Boolean logic expression of the family of patches. In the Boolean logic expression, critical patches are ANDed in the Boolean logic expression and supercedes critical patches are ORed in the Boolean logic expression. Finally, the method evaluates the Boolean logic expression with reference to obtained currently installed patches.

DESCRIPTION OF THE DRAWINGS

The accompanying drawings incorporated in and forming a part of the specification, illustrate several aspects of the present invention, and together with the description serve to explain the principles of-the invention. In the drawings.

DETAILED DESCRIPTION OF THE PREFERRED EMBODIMENT

Figure 1:
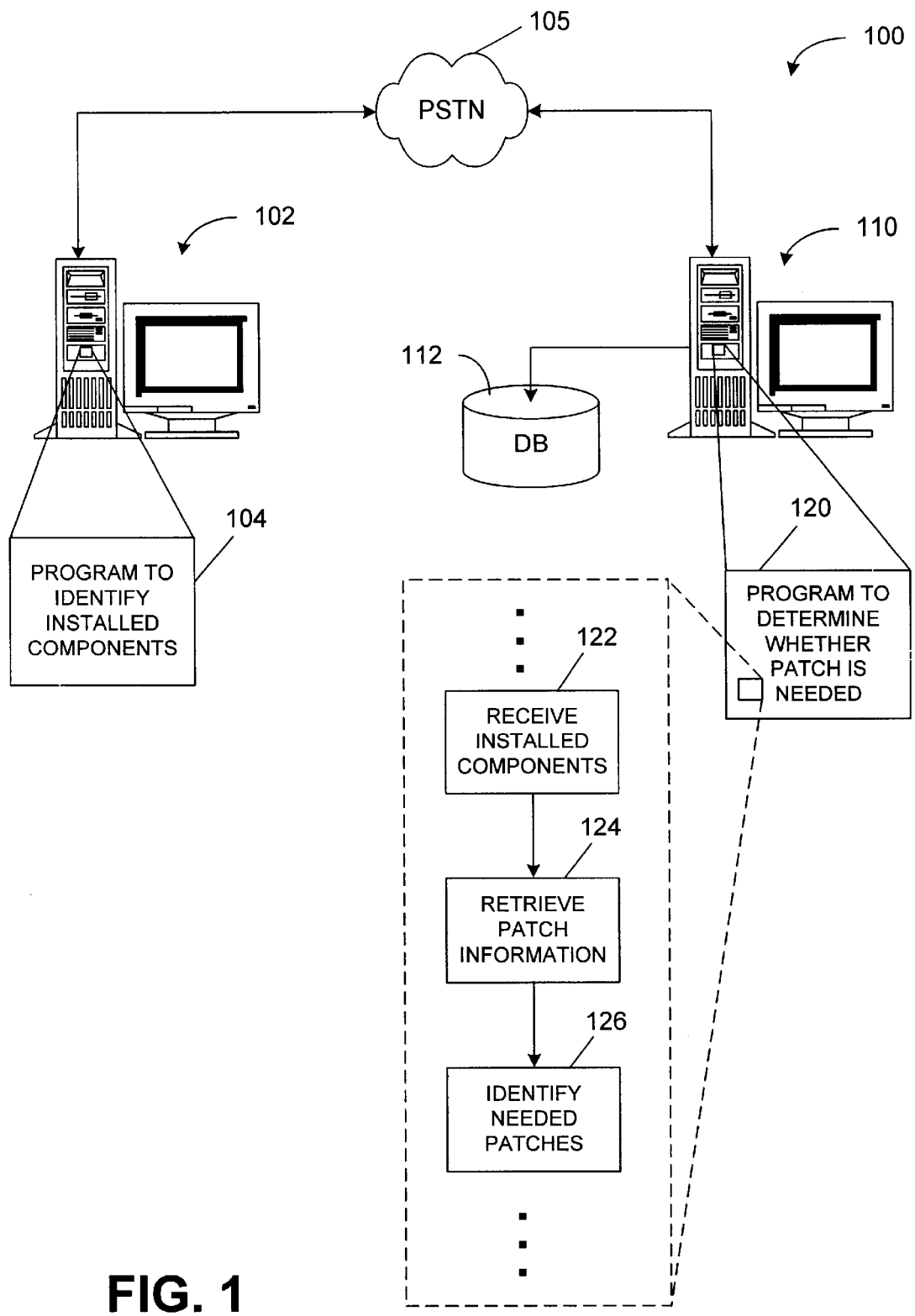
FIG. 1 is a block diagram of a system illustrating two computers configured for remote communication, where one of the computers may include a program that identifies software components currently installed, and the other computer executes a program to determine whether one or more patches should be installed on the first computer.

Having summarized various aspects of the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, reference is made to FIG. 1, which is a diagram that illustrates one potential embodiment of a system 100 implementing the present invention. The system 100 includes a first computer 102 that is configured to have certain software components installed. For the software components (not shown) it is an object of the present invention to perform any of several tasks. For example, in accordance with one aspect of the present invention, the system configuration of the computer 102 may be evaluated and compared against a database of software patch information to determine whether the software components currently installed on the computer 102 should be patched or updated. In accordance with another aspect of the present invention, a given software patch may be evaluated in connection with the configuration of software on computer 102, to determine whether the patch should be installed over the components presently existing on the computer 102.

To facilitate either of these aspects, a program 104 is provided to be executed on computer 102. This program 104 may be configured to evaluate and/or identify all software components that are installed on computer 102. It will be appreciated that, consistent with the scope and spirit of the present invention, this feature may be implemented in a variety of ways. In the preferred embodiment, the invention is operating in a UNIX environment, and the program 104 may be configured to gather configuration information in any of a variety of ways. It should be appreciated that non-UNIX systems, having a similar patch structure, may also be configured to operate in accordance with the present invention.

In the illustrated embodiment, a second computer system 110 is provided to determine whether: (1) critical patches exist that need to be installed on computer 102; and/or (2) whether a given patch should be installed on computer 102. As illustrated, computers 102 and 110 may be in communication through a telecommunications link. In one implementation, such a link may be routed through the PSTN 105. In alternative configurations, communication between remote computers 102 and 110 may be made via the Internet IP communications. Cellular or other links may also be used to facilitate communication between computers 102 and 110. In an alternative configuration, computers 102 and 110 may not be in communication with one another. Instead, the configuration of computer 102 may be supplied, or input, directly to computer 110 for evaluation.

In any of the foregoing scenarios, the computer 110 includes a program 120 that is configured to determine whether a patch (or patches) should be installed on computer 102. A database 112 containing patch information may be provided in connection with the computer 110 and utilized by the program 120 in making its determination. Although the operation of program 120 will be described in more detail below, in general it performs certain fundamental tasks. For example, the program 120 receives an identification of the software components that are installed on computer 102 (step 122). The program 120 also retrieves patch information, regarding the various family (or families) of patches that are relevant to the components that are installed on computer 102 (step 124). From this information, the program 120 identifies those patches within the family (or families) of patches that are needed to be installed on computer 102 to correct critical defects.

Figure 2:
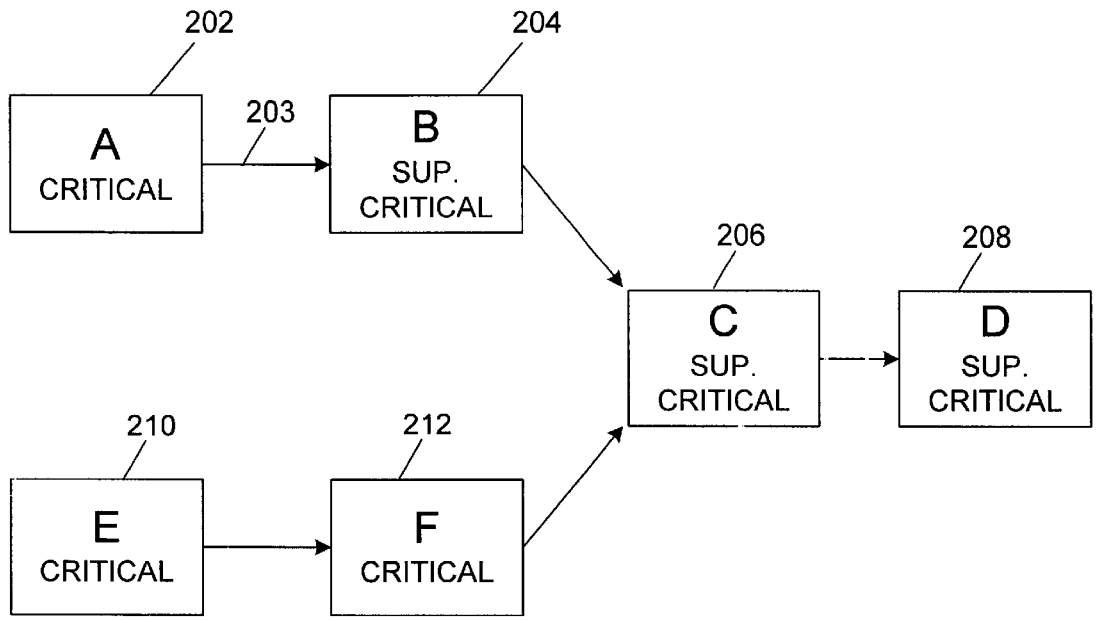
FIG. 2 is a block diagram illustrating one configuration in a small family of software patches.

Reference is now made to FIG. 2, which is block diagram that illustrates a relatively simplistic model of a small family of patches that relate to a given software program. The diagram of FIG. 2 will be briefly discussed immediately below, and will be referenced further when illustrating the execution of the flow chart of FIGS. 3A and 3B. Each block of FIG. 2 illustrates a software patch for a given computer program. There are six patches, labeled patch A through patch F. Specifically, patch A 202 is denoted as a critical patch. Patch B 204 is denoted as a supersedes critical patch. A line 203 leading from patch A 202 to patch B 204 represents the concepts that patch B 204 replaces, or supersedes patch A 202. As previously explained, a supersedes critical patch is one that replaces a prior critical patch, but the additional changes or corrections made by the supersedes patch are non-critical. Therefore, if the software program had neither patch A nor patch B installed, it would be preferred to install only patch B, as patch B provides the correction for the critical defect supplied by patch A, as well as additional program corrections. However, if the computer program all ready had patch A installed, then it may be desired to not install patch B, since, as a supersedes critical patch, patch B does not correct any critical defects, not already corrected by patch A. Patches C 206 and D 208 are also denoted as supersedes critical patches, which are in the same family of patches as patch A 202 and patch B 204. The use of the term "family" when describing a patch, indicates successive patches that are made to the same area or portion of a program. Diagrammatically, this is indicated by a line (e.g. line 203) connecting successive blocks.

Often, two or more families of patches may merge into a single family. This is illustrated by patches E 210 and F 212 merging with patches with patches A 202 and B 204 at patch C 206. Thus, initially patch A and patch B provide correction to one area or a portion of a program, whereas patches E and F provide correction to a separate area of a program. Patch C 206, however, affects both areas of the program, previously corrected by patches B 204 and F 212.

By way of illustration, assume that patch D 208 is the most recent patch in a series of patches provided for a software component installed upon a computer, and it must be determined whether or not it is necessary to install patch D 208 on a given system. This determination will necessarily require an evaluation of the current components (and patches) that are presently installed on the computer system. Of course, if patch D were a critical patch, no inquiry would need to be made, as the patch would need to be installed. However, as a supersedes critical patch, it may not be necessary to install patch D, depending upon the other components (i.e., patches) that are presently installed. By evaluating the diagram of FIG. 2, it should be appreciated that if patch C 206 were installed on the computer, then the supersedes critical patch of patch D need not be installed.

However, even if patch C 206 were not installed, it still may not be necessary to install patch D 208. As illustrated by patches A, B, E, and F, there were two initial areas within the software component that contain critical errors, corrected by these patches. Since patch B is a supersedes critical patch, it need not be installed if patch A had been installed previously. In contrast, patch F 212 is denoted as a critical patch, and therefore must be installed, notwithstanding the installation of patch C (if a later version is not installed). In short, if patch C 206 is not installed, patch D 208 need not be installed if patch F 212 and either patch A 202 or patch B 204 are installed. It should be appreciated that as the numbers of software patches for a given system increases, the determination for installing a new patch increases commensurately. Advantageously, the system and method of the present invention provides a methodological process for evaluating a family of patches, in connection with an identification of the components presently installed on a computer, to determine whether a new patch should be installed or not.

Figure 3A:
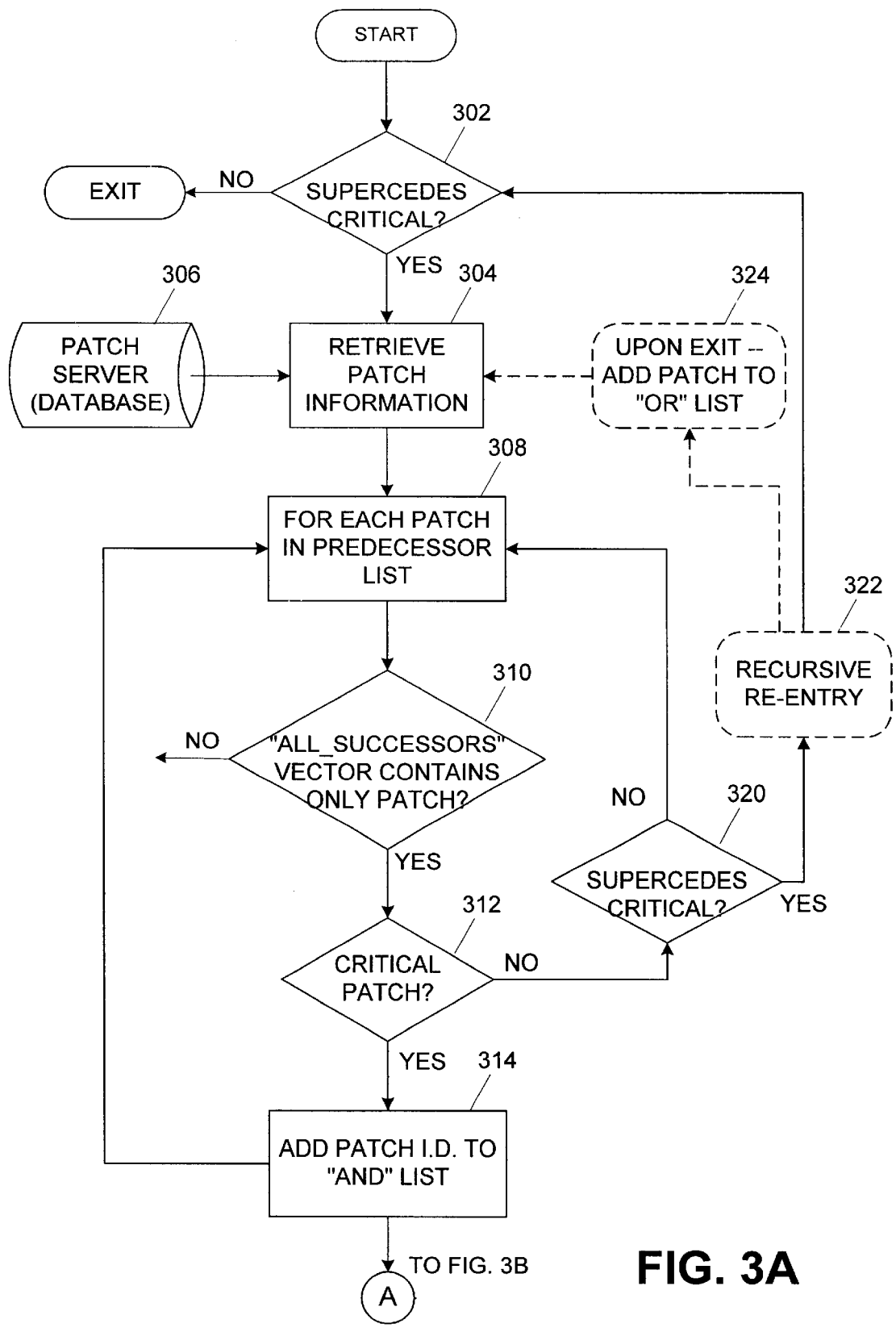
FIGS. 3A and 3B collectively comprise a flow chart that illustrates a top-level functional operation of one embodiment of the present invention.
Figure 3B:
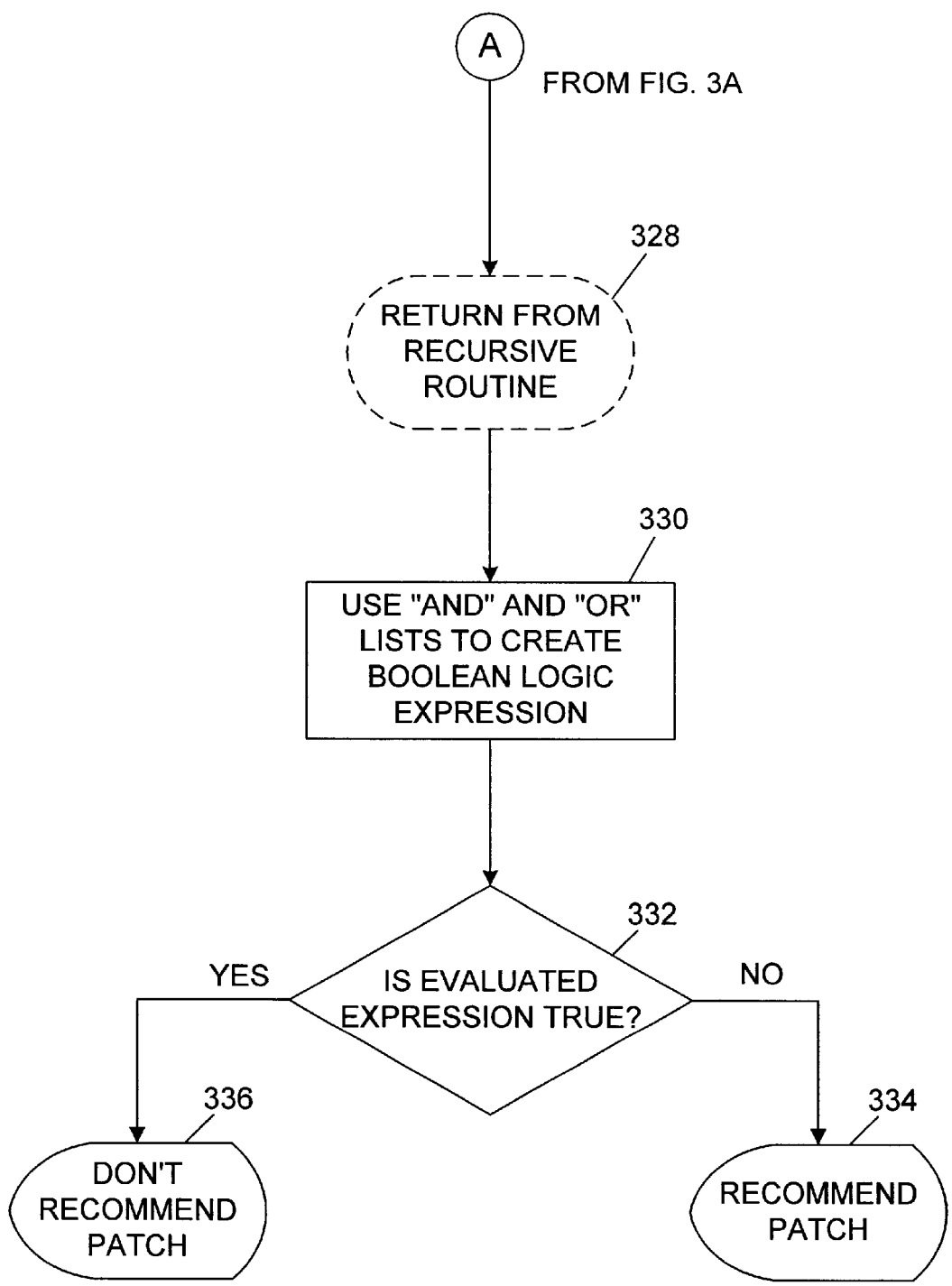

In this regard, reference is made to FIGS. 3A and 3B, which collectively comprise a flow chart that illustrates the logic, or program flow, of a preferred embodiment of the present invention. The basic flow and operation of the method illustrated in FIGS. 3A and 3B will be discussed immediately below. Then, in connection with Table 1, the flow of FIGS. 3A and 3B will be illustrated in connection with the evaluation of patch D 208 of FIG. 2. Specifically, the various steps of the flow chart of FIGS. 3A and 3B will be discussed in detail, in connection with the evaluation as to whether patch D 208 (of FIG. 2) should be installed on a computer system.

The flow chart of FIGS. 3A and 3B depicts a method that evaluates a given software patch to determine whether that patch should be installed on a given computer system. At the entry point of the flow chart, a first evaluation is made of a given patch to determine whether the status of that patch is supersedes critical (step 302). If not, no further evaluation need be made. Specifically, if the status of the patch is "non-critical," then no further evaluation needs to be undertaken, as the patch need not be installed. Likewise, if the status of the current patch is "critical", then no further evaluation need be made, as any new critical patch must be installed.

Figure 4:
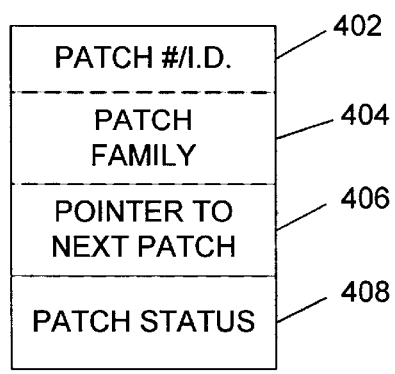
FIG. 4 is a diagram that illustrates certain components that may be stored in a database of patches.

After this initial evaluation, the method retrieves patch information from a database or patch server 306 (step 304). The information retrieved includes all patches that are related to the given patch. There are a wide variety of ways in which such identifications may be associated, and a recitation of these ways is not provided herein, as it is not deemed to be necessary in order to understand the concepts and teachings of the present invention. Nevertheless, by way of simple illustration, reference is made briefly to FIG. 4, which is a diagram illustrating certain components that may be stored in connection with each patch that may be stored in a database. These components may include a patch number or patch identifier 402, an identification of the software component or patch family 404, a pointer 406 that points to either the next successive patch, or previous patch in the family, as well as the patch status 408. It will be appreciated that the use of a pointer 406 facilitates the traversal of patches within a family of patches, and also facilitates the establishment of a predecessor list and a successor list, as will be discussed below.

Returning to the discussion of FIGS. 3A and 3B, once patch information has been retrieved from the database, then a sequence of steps will be executed. Specifically, a predecessor list is created (step 308). A predecessor list is a list of all patches within a family of patches that precede the current patch. For each patch in the predecessor list, an evaluation is made to determine whether all successor patches contain only the current patch or its equivalent. In this regard, the term "equivalent" refers to any counterpart patch that exists for differing versions of the operating system. That is, for different versions of a given operating system, different patches correcting similar errors, may be provided, and these are equivalent patches. To illustrate the concept of step 310 in reference to FIG. 2, if patch D 208 is currently under evaluation, its predecessor list includes all other patches, A, B, C, E, and F. Evaluating patch A, the "all_successors" vector of patch A includes patches B, and C. When evaluating step 310 for patch A 202, it is appreciated that the successors (B and C) contain more than just the current patch (patch D) or its equivalent. However, when evaluating step 310 for patch B 204, the successor patch (patch C 206) does contain only patch D or its equivalent. When step 310 resolves to true, step 312 evaluates the current patch (continuing with the example above, patch C) to determine whether it is a critical patch. If so, the patch is added to an AND list (step 314). If, however, step 312 resolves to false, then the current patch is evaluated to determine whether it is a supersedes critical patch (step 320). If not, the program flow returns to step 308. If, however, the current patch is a supersedes critical patch, then the routine of FIGS. 3A and 3B is reentered recursively. This is denoted by a recursive reentry block labeled step 322. Upon returning from the recursive routine, the current patch is added to an OR list (step 324). The lists created by steps 314 and 324 are then utilized to create a Boolean logic expression (step 330), which is evaluated (step 332) to determine whether a given patch should be installed on a given computer system. In the way that the Boolean logic expression is created, if it resolves to TRUE, then installation of the patch is not recommended (step 336). If, however, the string resolves to FALSE, then installation of the patch is recommended (step 334).

To further illustrate the operation and flow of the flow chart of FIGS. 3A and 3B, reference is made to Table 1. The first column of Table 1 denotes the step number of a particular block in the flow chart of FIGS. 3A and 3B. The second column of Table 1 denotes the patch identifier (if any) relevant to the current step. Finally, the third column of Table 1 denotes the action taken by the current step.

TABLE 1

| STEP | PATCH | ACTION |
| --- | --- | --- |
| 302 | D | Critical status = S: Yes |
| 304 | N/A | Retrieve patch information for D |
| 308 | N/A | For each patch in predecessor list (A, B, C, E, F): |
| 310 | A | All successors vector contain only patch D or equiv.?: No |
| 310 | B | All successors vector contain only patch D or equiv.?: No |
| 310 | C | All successors vector contain only patch D or equiv.?: Yes |
| 312 | C | Critical Patch?: No |
| 320 | C | Supersedes Critical Patch?: Yes |
| 302 | C | Critical Status = S: Yes |
| 304 | N/A | Retrieve patch information for C |
| 308 | N/A | For each patch in predecessor list (A, B, E, F): |
| 310 | A | All successors vector contain only patch C or equiv.?: No |
| 310 | B | All successors vector contain only patch C or equiv.?: Yes |
| 312 | B | Critical patch?: No |
| 320 | B | Supersedes Critical Patch?: Yes |

TABLE 1-continued

| STEP | PATCH | ACTION |
|---|---|---|
| 302 | B | Critical status = S: Yes |
| 304 | N/A | Retrieve patch information for B |
| 308 | N/A | For each patch in predecessor list (A): |
| 310 | A | All successors vector contain only patch B or equiv.?: Yes |
| 312 | A | Critical patch?: Yes |
| 314 | N/A | Add patch A to Boolean list as AND: {(A)} |
| 324 | N/A | Add patch B to Boolean list as OR: {(A OR B)} |
| 310 | E | All successors vector contain only patch C or equiv.?: No |
| 310 | F | All successors vector contain only patch C or equiv.?: Yes |
| 312 | F | Critical patch?: Yes |
| 314 | N/A | Add patch F to Boolean list as AND: {(A OR B) AND (F)} |
| 324 | N/A | Add patch C to Boolean list as OR: {((A OR B) AND F) OR (C)} |
| 310 | E | All successors vector contain only patch D or equiv.?: No |
| 310 | F | All successors vector contain only patch D or equiv.?: No |
| 330 | N/A | Final Boolean logic string: {((A OR B) AND F) OR (C)} |
| 332 | N/A | Evaluate Boolean logic string |

Table 1 illustrates the evaluation of the flow chart of FIGS. 3A and 3B for patch D 208 (of FIG. 2). Specifically, Table 1 illustrates the traversal and evaluation made by the flow chart of FIGS. 3A and 3B in determining whether patch D 208 should be installed on a given system. Step 302 evaluates patch D 208 to determine whether its critical status is "S" (i.e., supersedes critical). Since patch D is a supersedes critical patch, the program proceeds to step 304, where it retrieves patch information for patch D 208; namely step 304 retrieves from a patch server or database all other patches relating to patch D (i.e., all other patches within the family of patch D). This includes information about patch A 202, patch B 204, patch C 206, patch E 210, and patch F 212. Each of these patches are in the predecessor list to patch D 208, and are evaluated by the loop beginning with step 308.

Beginning with the first patch in the predecessor list (patch A), step 310 evaluates the "all_successors" vector to determine whether it contains only patch D or its equivalent. Since the successor vector to patch A includes patches B and C as well, step 310 resolves to NO and the program flow returns to step 308. Step 310 is then evaluated for the second patch (patch B in the predecessor list), and again resolves to NO. Upon the third evaluation of step 310 (i.e., the evaluation of patch C), step 310 resolves to YES and therefore the program flow proceeds to step 312. Since patch C is a supersedes critical patch, the evaluation of step 312 resolves to NO, and the program flow proceeds to step 320, which evaluates patch C to determine whether it is a supersedes critical patch. Since step 320 resolves to YES, the routine of FIGS. 3A and 3B is reentered recursively. Therefore, program flow is returned to step 302, where the critical status of patch C is evaluated. Since patch C is also a supersedes critical patch, the program flow proceeds to step 304, where the system may retrieve from the database or patch server any additional relevant information about patch C.

The system then proceeds to step 308, which commences a loop on all patches A, B, E, and F, which are in the predecessor list to patch C. For each such patch, the method evaluates the "all successors" vector to determine whether this vector only contains patch C or its equivalent. Step 310 resolves to NO when evaluating patch A, but resolves to YES when evaluating patch B (i.e., patch C is the only patch in the "all successors" vector of patch B). The method then proceeds to step 312 where it evaluates the critical status of patch B. Since patch B is not a critical patch, the method proceeds to step 320, where it determines whether patch B is a supersedes critical patch. Since this evaluation of step 320 resolves to YES, the method reenters (recursively) the routine, again at step 302. At step 302, the current patch (patch B) is evaluated to determine whether it is a supersedes critical patch. Since it is, the method proceeds to step 304 where it retrieves patch information for patch B.

Beginning with step 308, the method loops on all patches (only patch A) that are in the predecessor list to patch B. Step 310 then evaluates the "all successors" vector for patch A, which only contains patch B (i.e., resolves to YES). Step 312 then evaluates patch A to determine whether it is a critical patch. Since patch A is, in fact, a critical patch, step 314 adds patch A to a Boolean AND list. Since this is the first execution of either steps 314 or 324, the method may begin to create a Boolean logic expression, listing patch A. After executing step 314, and since the loop begun at step 308 for patch B is complete, the method proceeds to step 328 where it returns from the recursive call initiated at block 322. Upon return from the recursive call, the method proceeds to step 324 where it adds patch B (the patch currently under evaluation at the time of the recursive call) to the Boolean logic expression as a logic OR. Therefore, the expression at this point is: patch A OR patch B (alternatively referred to as A OR B). Thereafter, the method returns to step 310 (now executing from the point of previous execution before the recursive routine had been called) where it evaluates the "all_successors" vector of patch E to determine whether it only includes patch C or its equivalent. Since this resolves to NO, the method again returns to step 310 and performs the same evaluation for patch F. Since the "all_successors" vector for patch F does contain only patch C or its equivalent, step 310 resolves to YES, and the method proceeds to step 312 where it determines whether patch F is a critical patch. Since patch is, indeed, a critical patch the system proceeds to step 314, where it adds patch F to the existing Boolean logic expression in an AND relationship. Therefore, after adding patch F to the expression, the expression is now: (A OR B) AND F. At step 328, the method again returns from the nested recursive call, to step 324 where it adds patch C to the Boolean expression in an OR relationship. Therefore, the Boolean expression is: ((A OR B) AND F) OR C. The method again returns to the loop commenced at step 308 and, at step 310, evaluates the "all successors" vector of patch E to determine whether it contains only patch D or its equivalent. Since this resolves to NO, the system loops back and again evaluates (at step 310) whether the "all_successors" vector of patch F contains only patch D or its equivalent. Again, this resolves to NO and the loop commenced at step 308 has completed. Since, at this point, each recursive call has been returned, the method then proceeds to step 330 where it constructs the final Boolean logic expression which is: ((A OR B) AND F) OR C. The method then evaluates this logic equation at step 332. In this regard, step 332 utilizes the configuration of the current system under evaluation. Based upon the logic equation, if the system already has installed patch C or patch F and either patch A or B, then the new patch (patch D) need not be installed. If, however, the logic equation resolves to FALSE (based upon the currently installed components), then the method recommends the installation of patch D.

It should be appreciated that the method of FIGS. 3A and 3B greatly simplifies the process of determining whether a given patch should be installed on a given system, particularly where numerous patches for a given software component exists. It should be further appreciated that, in accordance with one aspect of the invention, a given system may be evaluated to determine all software components presently installed on the system. This information may then be utilized in connection with the retrieval of patch information for all families of patches corresponding to software components that are installed on the system. For each such family, the system may evaluate the software components currently installed to determine whether any additional patches or updates should be installed, and make the appropriate recommendations.

Figure 5:
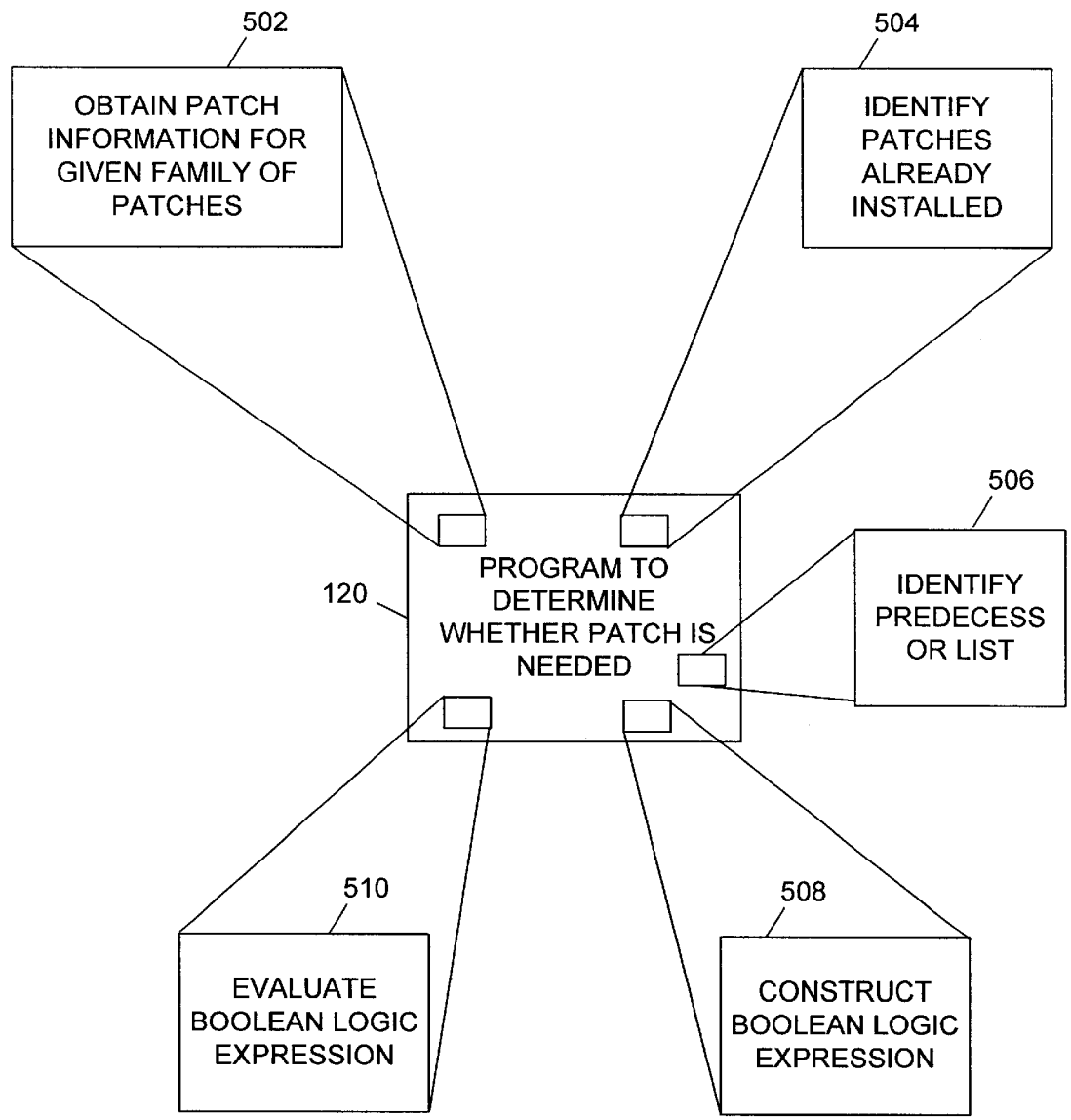
FIG. 5 is a diagram that illustrates certain segments that may be provided as part of a computer program constructed in accordance with one embodiment of the invention.

Having described the method of the present invention, it will be appreciated that the steps illustrated in the flow chart of FIGS. 3A and 3B are provided for purposes of illustration and is not deemed to be limiting on the broader aspects of the present invention. Indeed, the broader aspects of the present invention may be implemented using a variety of different approaches that are still consistent with the scope and content of the present invention. As illustrated in FIG. 5, a portion of the system is configured determine whether the installation of a given supercedes critical patch is necessary in order to correct a critical defect in a given system. In the preferred embodiment, the system comprises software, which may be provided on a computer readable storage medium in a form of code segments that are particularly configured to perform various functions.

In this regard, reference is now made to FIG. 5, which illustrates certain functions which may be carried out by a system constructed in accordance with the teachings of the invention. For example, the program 120 for determining whether a patch is needed may comprise a plurality of code segments including a segment 502 for obtaining patch information for a given family of patches. Another segment 504 may be provided for identifying patches already installed on a given computer. Yet another segment 506 may be configured to identify a predecessor list for a given patch. Other segments 508 and 510 may be configured to construct and evaluate a Boolean logic expression, which is used to determine whether a given patch should be installed on a given computer. Yet additional segments (not illustrated) may be provided in connection with the system of the present invention, as will be appreciated by persons of skill in the art in light of the teachings provided herein.

It should be appreciated that the flow chart of FIGS. 3A and 3B shows the top-level operation of only one possible implementation of the methods of the present invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3A and 3B. For example, two blocks shown in succession may in fact be executed substantially concurrently or the blocks may sometimes be executed in the reverse order, depending upon the functionality involved.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for identifying critical patches for installation on a given computer system comprising the steps of:
    obtaining an identification of installed components on the computer system;
    obtaining a list of all relevant patches for the installed components;
    generating a Boolean logic expression for each relevant patch, the Boolean logic expression identifying other relevant patches which are recommended for installation; and
    evaluating each Boolean logic expression to determine a minimal set of patches to be installed, which minimal set of patches include all patches for all critical errors.

2. The method as defined in claim 1, wherein the step of obtaining an identification of installed components on the computer system includes manually identifying each installed component.

3. The method as defined in claim 1, wherein the step of obtaining an identification of installed components on the computer system includes executing a program that evaluates a system configuration of the computer system.

4. A method for determining whether a given software patch is a critical patch that is recommended for installation on a given computer system, the method comprising the steps of:
    obtaining patch information for a family of patches that are related to the given software patch;
    obtaining an identification of patches within the family of patches that are currently installed on the computer system;
    identifying a predecessor list, wherein the predecessor list includes a sequence of patches in the family of patches that precede the given software patch;
    constructing a Boolean logic expression of the family of patches, wherein critical patches are ANDed in the Boolean logic expression and supercedes critical patches are ORed in the Boolean logic expression; and
    evaluating the Boolean logic expression with reference to obtained currently installed patches.

5. The method as defined in claim 4, wherein the step of obtaining an identification of patches currently installed on the computer system includes manually identifying each installed patch.

6. The method as defined in claim 4, wherein the step of obtaining an identification of patches currently installed on the computer system includes executing a program that evaluates a system configuration of the computer system.

7. The method as defined in claim 4, wherein the step of obtaining an obtaining patch information for a family of patches includes the step of retrieving information from a database.

8. The method as defined in claim 7, wherein the step of retrieving information from a database includes retrieving associated patch records from the database.

9. The method as defined in claim 4, further including the step of constructing the predecessor list from relational information contained within patch records stored in a database.

10. The method as defined in claim 9, wherein the relational information includes a link with a predecessor patch.

11. The method as defined in claim 4, wherein the step of constructing the Boolean logic expression of the family of patches includes the step of constructing a successor list for each patch within the predecessor list, the successor list containing an identification of all patches within the family of patches that follow a given patch.

12. The method as defined in claim 11, wherein the step of constructing the Boolean logic expression includes the step of evaluating each patch in the predecessor list to determine whether all successor vectors contain only the given patch.

13. The method as defined in claim 12, wherein the step of constructing the Boolean logic expression further determining, for a given patch having all successor vectors containing only the given patch, whether the given patch is a critical patch.

14. The method as defined in claim 13, further including the step of ANDing the given patch into the Boolean logic expression, if the given patch is a critical patch.

15. The method as defined in claim 12, wherein the step of constructing the Boolean logic expression further determining, for a given patch having all successor vectors containing only the given patch, whether the given patch is a supercedes critical patch.

16. The method as defined in claim 15, further including the step of ORing the given patch into the Boolean logic expression, if the given patch is a supercedes critical patch.

17. A computer readable medium containing program code for determining whether a given software patch is a critical patch that is recommended for installation on a given computer system comprising:

a segment for obtaining patch information for a family of patches that are related to the given software patch;

a segment for obtaining an identification of patches within the family of patches that are currently installed on the computer system;

a segment for identifying a predecessor list, wherein the predecessor list includes a sequence of patches in the family of patches that precede the given software patch;

a segment for constructing a Boolean logic expression of the family of patches, wherein critical patches are ANDed in the Boolean logic expression and supercedes critical patches are ORed in the Boolean logic expression; and a segment for evaluating the Boolean logic expression with reference to obtained currently installed patches.

18. A computer system including the computer readable medium as defined in claim 17.

* * * * *